United States Patent
Pettinotto (10) Patent No.: US 12,014,623 B2
(45) Date of Patent: Jun. 18, 2024

(54) WIRELESS CONTROL DEVICES

(71) Applicant: Schneider Electric Industries SAS, Rueil Malmaison (FR)

(72) Inventor: Gilles Pettinotto, Vaulnaveys le Haut (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 60 days.

(21) Appl. No.: 17/971,909

(22) Filed: Oct. 24, 2022

(65) Prior Publication Data

US 2023/0136540 A1 May 4, 2023

(30) Foreign Application Priority Data

Oct. 29, 2021 (FR) ...................................... 2111567

(51) Int. Cl.
*G08C 17/02* (2006.01)
*H01H 13/14* (2006.01)
*H02J 50/00* (2016.01)

(52) U.S. Cl.
CPC ............ *G08C 17/02* (2013.01); *H02J 50/001* (2020.01); *H01H 13/14* (2013.01)

(58) Field of Classification Search
None
See application file for complete search history.

(56) References Cited

U.S. PATENT DOCUMENTS

| | | | | |
|---|---|---|---|---|
| 4,634,973 A | * | 1/1987 | Murakami | G01D 5/247 324/207.16 |
| 6,693,851 B1 | * | 2/2004 | Fujisawa | G04C 10/00 368/203 |
| 2002/0190610 A1 | | 12/2002 | Andre et al. | |
| 2013/0134798 A1 | | 5/2013 | Meftah et al. | |

FOREIGN PATENT DOCUMENTS

| | | |
|---|---|---|
| WO | 0145139 A2 | 6/2001 |
| WO | 2012025335 A1 | 3/2012 |

* cited by examiner

*Primary Examiner* — Carlos Garcia
(74) *Attorney, Agent, or Firm* — Locke Lord LLP (57) ABSTRACT

A wireless control device includes a housing, a movable actuation element, an electronic control circuit including a wireless transmitter capable of transmitting a control signal to an electrical device, an energy harvesting device configured to power the electronic control circuit, by converting mechanical energy into electrical energy when the movable actuation element is actuated, by delivering an output electrical voltage whose sign depends on the direction of movement of the transmission mechanism. The control circuit further includes a pulse detection circuit configured to identify the sign of the output electrical voltage and to store information representative of the sign of the output electrical voltage, the transmitter being further configured to include, in the control signal sent, the information representative of the sign of the output electrical voltage.

10 Claims, 5 Drawing Sheets

WIRELESS CONTROL DEVICES

TECHNICAL FIELD

The present invention relates to a wireless control device.

The invention is advantageously applicable to wireless switches, or more generally to any sensor or mechanically actuatable control device, such as a closure detector associated with a door or a window.

BACKGROUND

There are wireless control devices, for example wall switches, which are used to control domestic devices without the need for a wired link between the control device and the domestic device.

Such control devices comprise a radio interface capable of sending a radio message to the device each time the control device is mechanically actuated, whether by a user or by an object.

Often, the electrical power needed to send the radio message is obtained by energy harvesting means which are activated by the action of a user on a movable actuation element of the control device, such as a button. Thus, the control device is energy-autonomous. The patent application FR 3079654 A1 describes an example of such a wireless control device.

These known control devices have the drawback of it being impossible to determine the position of the control element. It is only possible to detect that the movable element of the control device has been actuated, without knowing the position to which this movable element has been displaced. Now, in many cases, it may be desirable to drive the appliance differently according to the position of the movable element, depending on whether the control device is actuated from a first position to a second position, or vice versa.

WO-2012/025335-A1 describes, for example, a push button with position detection.

SUMMARY

It is these drawbacks that the invention more particularly sets out to remedy by proposing a wireless control device capable of determining the position of a control member of the wireless control device and of sending a control signal to a remote appliance, the control signal being able to be a function of the determined position.

To this end, one aspect of the invention relates to a wireless control device, comprising:
  a housing,
  a movable actuation element that can be operated from the outside of the housing,
  an electronic control circuit comprising a wireless transmitter capable of transmitting a control signal to an electrical device,
  an energy harvesting device configured to electrically power the electronic control circuit, the energy harvesting device being mechanically coupled to the movable actuation element by means of a transmission mechanism and configured to convert mechanical energy into electrical energy when the movable actuation element is actuated by delivering an output electrical voltage between the output terminals,
wherein the direction of movement of the transmission mechanism determines the sign of the output electrical voltage delivered by the energy harvesting device,
wherein the control circuit further comprises an electrical power supply device and a pulse detection circuit, the electrical power supply device and the pulse detection circuit being connected in parallel between the output terminals of the energy harvesting device and an input of the transmitter,
wherein the electrical power supply device is configured to accumulate the electrical energy supplied by the energy harvesting device and to, with the accumulated electrical energy, electrically power the transmitter temporarily for the transmitter to be able to send the control signal, and
wherein the pulse detection circuit is configured to identify the sign of the output electrical voltage and to store information representative of the sign of the output electrical voltage, the transmitter being further configured to include, in the control signal sent, the information representative of the sign of the output electrical voltage.

By virtue of the invention, it is possible to detect the position of the movable actuation element each time the movable actuation element is actuated. The corresponding information can then be incorporated in the control signal which is sent to the remote device. Everything is done by an energy-autonomous control device, in which the processing and the sending of the control signal are performed using energy collected upon the actuation of the movable actuation element.

According to aspects that are advantageous but not mandatory, such a wireless control device can incorporate one or more of the following features, taken alone or according to any technically admissible combination:
  the sign of the electrical voltage delivered by the energy harvesting device is positive when the transmission mechanism is displaced in a first direction and negative when the transmission mechanism is displaced in a second direction, the second direction being opposite to the first direction;
  the pulse detection circuit comprises a memory, such as a capacitor, configured to store a signal representative of the sign of the voltage delivered by the energy harvesting device;
  the electronic control circuit is configured to automatically empty the memory of the pulse detection circuit once the sign of the voltage delivered by the energy harvesting device has been identified by the electronic control circuit;
  the pulse detection circuit comprises a capacitor and a resistor;
  the control device comprises:
    an additional movable actuation element,
    an additional energy harvesting device mechanically coupled to the additional movable actuation element and configured to electrically power the electronic control circuit,
  at least one additional pulse detection circuit connected at the output of the additional energy harvesting device, the additional pulse detection circuit being connected to the electronic control circuit and being configured to identify the sign of the output electrical voltage of the additional pulse detection circuit and to store information representative of the sign of said output electrical voltage;
  the transmitter is a radio transmitter;
  the wireless control device is a switch of pushbutton type;
  the wireless control device is a toggle switch;
  the control device is energy-autonomous.

BRIEF DESCRIPTION OF THE DRAWINGS

The invention will be better understood and other advantages thereof will become more clearly apparent in light of the following description of an embodiment of a wireless control device given purely as an example and with reference to the attached drawings, in which.

DETAILED DESCRIPTION

Figure 1:
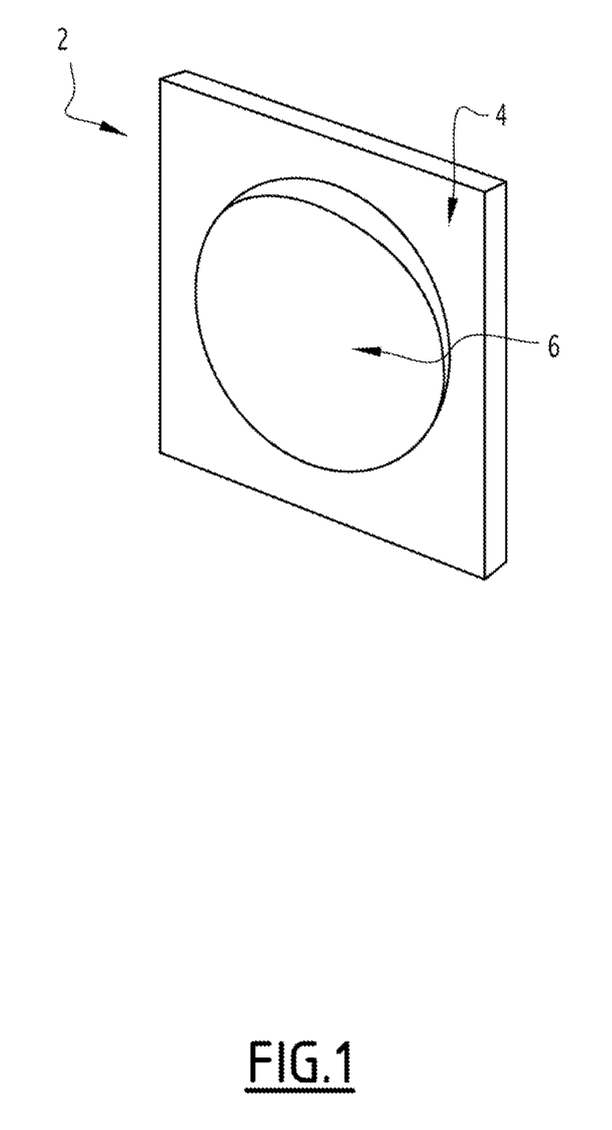
FIG. 1 schematically represents an outside view of a wireless control device, such as a wall switch, that conforms to embodiments of the invention.

FIG. 1 schematically represents a wireless control device 2.

For example, the wireless control device is a switch, preferably a wall switch, but the invention is not limited to this example and, in many variants, the control device 2 could take other forms. For example, the device 2 could be an electromechanical sensor capable of detecting the opening or the closing of a closure element such as a door or a window or a hatch.

The device 2 comprises a housing 4 and a movable actuation element 6.

For example, the housing 4 forms a shell or a frame, which can be fixed onto a wall or onto an appropriate support.

For example, the movable actuation element 6 is a button.

Hereinafter in the description, the movable actuation element 6 is, for convenience, designated by the term "button", but that does not prevent the movable actuation element 6 from taking forms other than that of a button designed to be able to be actuated by a user. In variants, it could be an element that can be mechanically actuated by an object such as a door. Any reference to the button 6 should therefore preferably be understood as a reference to a more generic movable actuation element 6.

The housing 4, like the button 6, can be made of plastic material.

The button 6 can be operated from the outside of the housing 4. The button 6 forms a movable part with respect to the housing 4. The button 6 can be displaced between two stable positions.

For example, a first stable position corresponds to an on state and a second stable position corresponds to an off state.

In some embodiments, the control device 2 is a toggle switch, in which the button 6 can be displaced between its two positions by pivoting about an axis of rotation.

In other embodiments, the control device 2 is a switch of pushbutton type, in which the button 6 can be displaced between its two positions by translation along a displacement axis.

In other embodiments, depending on the nature of the remote device controlled by the switch, other positions of the button 6 could be defined, notably one or more intermediate positions included between the two stable positions defined above. The control device 2 could for example be a dimmer switch, in which the button 6 would be able to be displaced continually between extreme positions. The form of the button 6 could also be different, notably depending on the nature of the control device 2.

Generally, the control device 2 is configured to drive a remote device, by sending a wireless control signal, such as a radio message or a light message. This control signal is sent in reaction to the actuation of the button 6 by a user.

According to many embodiments, the remote device is an item of home automation equipment, that can be installed in a home automation system. The remote device can, for example, be an electrical shutter, or an electrical blind, or a light fitting, or a ventilation or heating system, or any similar device, or an electronic controller controlling one or more of the above elements, these examples not being limiting and many other types of devices being able to be considered.

It is understood that the control device 2 is not connected to the remote device by a cable or a wire.

Furthermore, the control device 2 is energy-autonomous, that is to say that it is not supplied with electricity by an electrical source such as an electrical network.

Figure 2:
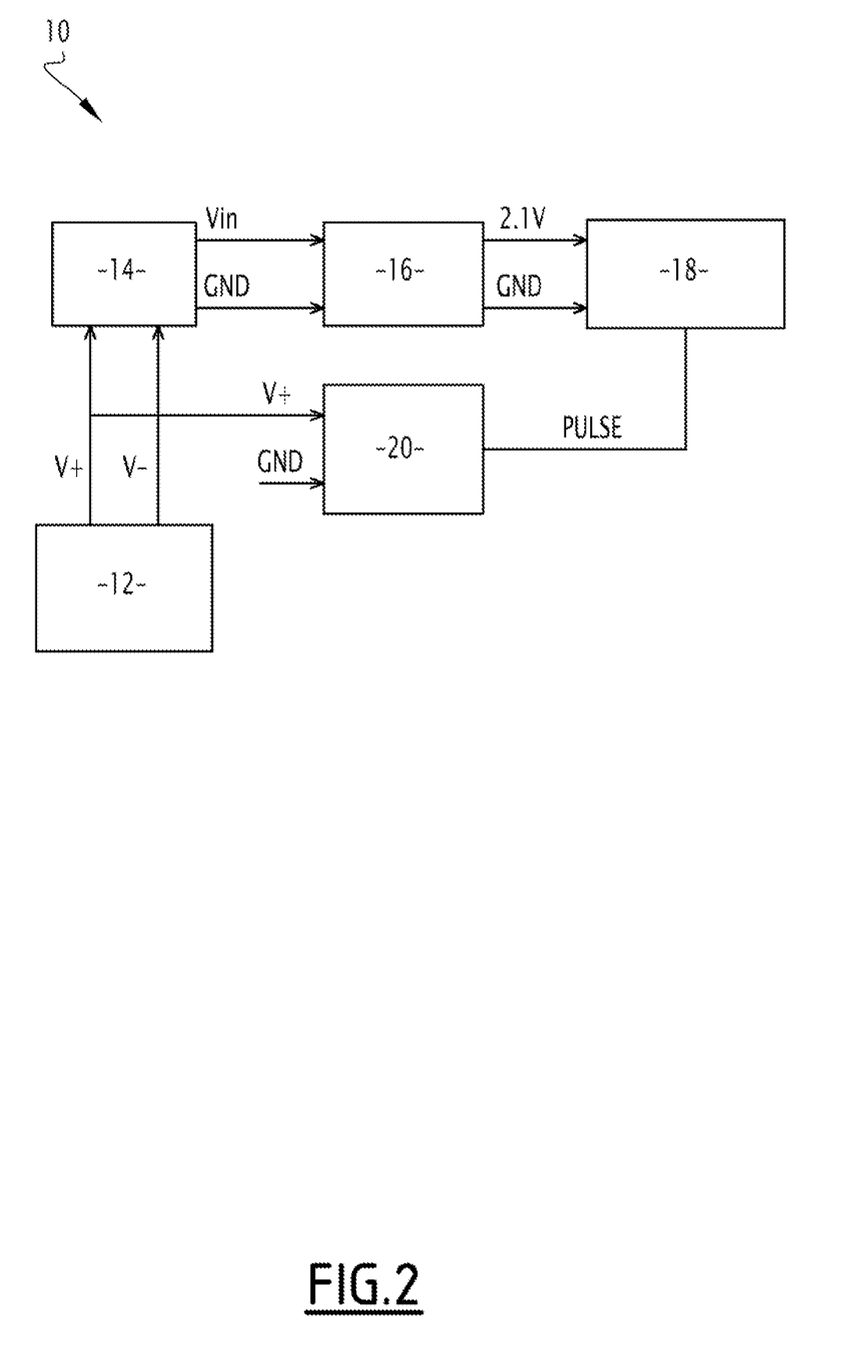
FIG. 2 is a block diagram of a wireless control device that conforms to embodiments of the invention.

To this end, as illustrated in the diagram of FIG. 2, the control device 2 also comprises:
- an electronic control circuit 18 comprising a wireless transmitter capable of transmitting a control signal to an electrical device,
- an energy harvesting device 12, configured to electrically power the electronic control circuit 18,
- an electrical power supply device, here bearing the references 14 and 16, and
- a pulse detection circuit 20.

The assembly 10 of these elements forms, for example, a processing chain which is coupled to the button 6. These elements are, here, housed inside the housing 4.

The energy harvesting device 12 is mechanically coupled to the button 6 by means of a transmission mechanism (not illustrated).

The energy harvesting device 12 is configured to convert mechanical energy into electrical energy when the button 6 is actuated, by delivering an output electrical voltage between output terminals of the energy harvesting device (denoted V+ and V− in FIG. 2).

For example, the energy harvesting device 12 comprises one or more piezoelectric and/or electromechanical elements associated with the transmission mechanism and being capable of generating an electrical voltage from the displacement of the transmission mechanism.

The direction of movement of the transmission mechanism determines the sign of the output electrical voltage delivered by the energy harvesting device 12.

It is understood that the direction of movement of the transmission mechanism depends on the direction of displacement of the button 6 from one position to the other.

For example, when the button 6 is displaced from a first position to a second position, the transmission mechanism is displaced in a first direction. When the button 6 is displaced from the second position to the first position, the transmission mechanism is displaced in a second direction, generally opposite to the first direction.

According to embodiments, the sign of the electrical voltage delivered by the energy harvesting device 12 is positive when the transmission mechanism is displaced in a first direction and negative when the transmission mechanism is displaced in a second direction, the second direction being opposite to the first direction.

The voltage delivered by the energy harvesting device 12 can take the form of one or more voltage pulses, an example of which will be described hereinbelow with reference to FIG. 4.

In some embodiments, the button 6 and the energy harvesting device 12 can be incorporated in a same mechanical module. As a variant, it can involve distinct components which are assembled together.

The electrical power supply device 14, 16, is configured to accumulate the electrical energy supplied by the energy harvesting device.

The electrical power supply device 14, 16 is also configured to electrically power the wireless transmitter (and more generally to power the electronic control circuit 18), temporarily and with the accumulated electrical energy, for the wireless transmitter to be able to send the control signal.

In the example illustrated, the electrical power supply device comprises a rectifier 14 and a DC-DC power converter 16.

The rectifier 14 is, here, connected, by its input, to the output terminals V+, V− of the energy harvesting device 12.

The rectifier 14 is, here, connected by its output to the power converter 16, to deliver an electrical voltage Vin to the power converter 16, this voltage being here measured with respect to the electrical ground GND of the system 10.

For example, the rectifier 14 comprises a single-alternating or multiple-alternating rectifier, such as a diode bridge.

According to embodiments, the power converter 16 comprises a voltage converter.

Other embodiments are possible as variants.

The electrical power supply device 14, 16 delivers, as output, a rectified DC voltage which is used to temporarily power the electronic control circuit 18.

In the example illustrated, the output voltage is equal to 2.1 volts.

In practice, the electronic control circuit 18 is powered electrically by the electrical power supply device 14, 16 only for a short time, following actuation of the button 6, since there is no other source of electrical power supply in the control device 2.

For example, the electrical power supplied at the output of the energy harvesting device 12 is delivered only for a very short time, for example a time less than 10 milliseconds or less than 5 milliseconds.

The electrical power supply device 14, 16 advantageously comprises means for temporarily storing the electricity generated by the energy harvesting device 12, such as a capacitor. The electrical energy delivered by the energy harvesting device 12 is thus temporarily stored then restored in the form of an electrical voltage making it possible to power the electronic control circuit 18 for a longer time, for example for a time less than a second or less than 500 milliseconds.

In many embodiments, the electronic control circuit 18 comprises a processor, such as a programmable microcontroller or a microprocessor.

For example, the processor is coupled to a computer memory, such as a read-only memory (ROM) or a Flash memory or a computer-readable data storage medium, including executable instructions and/or a software code provided to, in particular, implement a method for constructing and sending a control message when these instructions are executed by the processor.

The use of the term "processor" does not prevent, as a variant, at least a part of the functions of the electronic control circuit 18 from being performed by other electronic components, such as a digital signal processor (DSP) or a reprogrammable logic component (FPGA), or a custom integrated circuit (ASIC), or any equivalent element, or any combination of these elements.

Preferably, the transmitter of the electronic control circuit 18 is a radio transmitter capable of sending a radiofrequency message.

For example, a short-range radio link, such as a Bluetooth (registered trademark) or Bluetooth Low Energy (registered trademark) or Zigbee (registered trademark) link, or equivalent, is used. As a variant, a long-range link with low bit rate, such as LORA or Sigfox (registered trademarks), or equivalent, can be used.

As a variant, other wireless communication means could be used, for example by using light signals in the visible light or infrared spectrum.

Preferably, the processor of the electronic control circuit 18 is a processor with low electrical consumption.

The pulse detection circuit 20 is configured to identify the sign of the output electrical voltage and to store information representative of the sign of the output electrical voltage, the wireless transmitter of the electronic control circuit 18 being further configured to include, in the control signal sent, the information representative of the sign of the output electrical voltage.

Generally, the electrical power supply device 14, 16 and the pulse detection circuit 20 are connected in parallel between the output terminals of the energy harvesting device (in this case, of the converter 16) and an input of the transmitter (here, of the electronic control circuit 18).

For example, an input of the pulse detection circuit 20 is connected to an output (V+) of the energy harvesting device 12.

Figure 3:
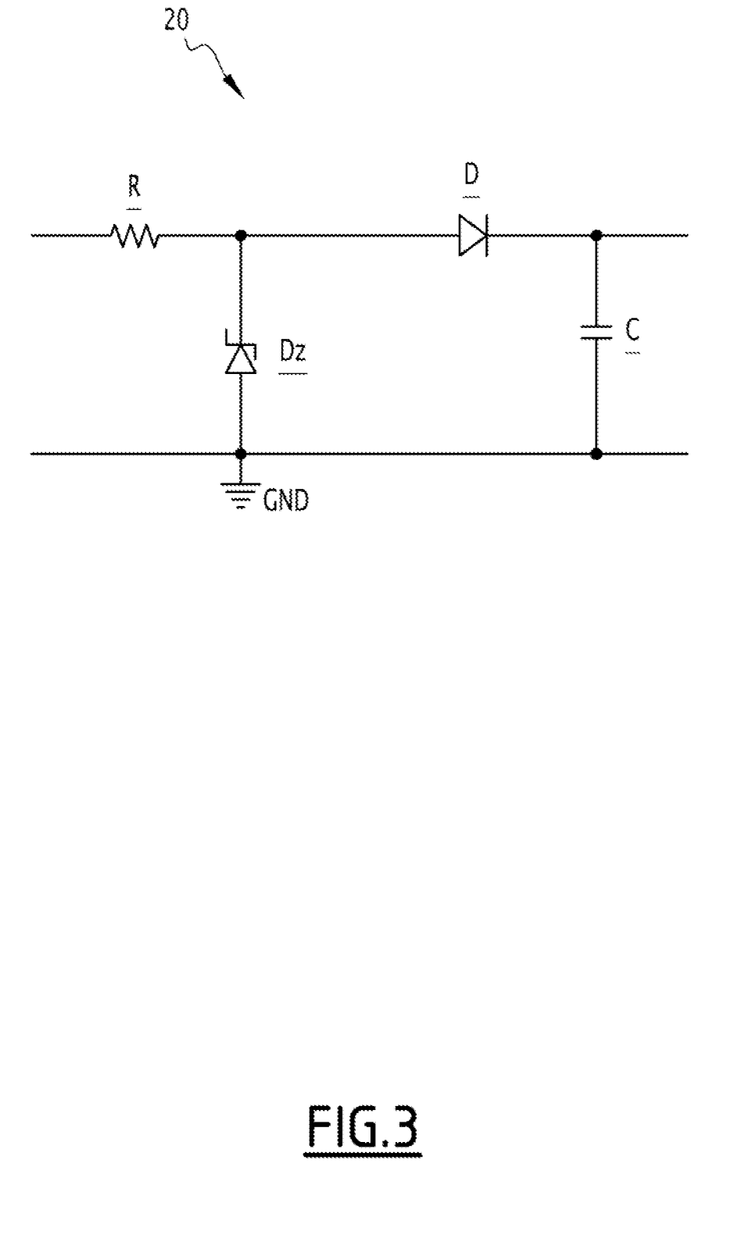
FIG. 3 schematically represents an embodiment of a pulse detection circuit belonging to the wireless control device of FIG. 2.

FIG. 3 represents an exemplary embodiment of a pulse detection circuit 20.

The pulse detection circuit 20 comprises a resistor R, a capacitor C, a diode D and a Zener diode Dz.

The resistor R and the diode D are connected in series with one another between the input and the output of the pulse detection circuit 20.

The resistor R is, here, connected on the side of the input of the pulse detection circuit 20 while the diode D is connected on the side of the output of the pulse detection circuit 20 with its cathode on the side of the output.

The Zener diode Dz is connected between the resistor R and the electrical ground GND, for example with the anode of the Zener diode Dz connected to the electrical ground.

The capacitor C is connected between the cathode of the diode D and the electrical ground GND.

As will be understood on reading the above explanations, the capacitor C is to be charged when the pulse detection circuit 20 receives a voltage pulse at the input, then to deliver a voltage when it is discharged after the pulse has passed.

The capacitor C therefore acts as a memory which stores information on the sign of voltage pulse detected (and therefore on the direction of displacement of the button 6). Preferably, the capacitance of the capacitor C is chosen to minimize the energy losses in the charging and the discharging of the capacitor C.

In this specific example, the pulse detection circuit 20 is only capable of detecting a voltage pulse of positive sign. Only a pulse corresponding to a single direction of displacement can therefore be directly detected.

For example, to detect a voltage of opposite sign, such a pulse detection circuit can be used with, added to it at the input, a device allowing the sign of the current to be inverted.

To distinguish between a voltage of a first sign and a voltage of the opposite sign with a same pulse detection circuit, it can be considered that there is a pulse of a second sign (for example a pulse of the sign opposite to the sign that can be detected with this detection circuit) when the detection circuit detects nothing even though it is known that a pulse has indeed been received (because the electronic control circuit 18 has been restarted and therefore electrically powered by such a pulse, since it cannot be electrically powered other than following the reception of such a voltage pulse).

For example, in this case, the information representative of an output electrical voltage of positive sign corresponds to the presence of a voltage at the terminals of the capacitor C when the latter is discharged just after the voltage pulse (represented by the reference "PULSE" in FIG. 2). The information representative of an output electrical voltage of negative sign corresponds to an absence of voltage at the terminals of the capacitor C, since the latter is not charged.

The value of the resistor R and the capacitance value of the capacitor C are chosen by making a trade-off between the time for which the sign of the pulse is stored and the energy consumption, here partly due to the losses by Joule's effect in the resistor R.

It is important for these losses to be as low as possible, because the energy harvesting device 12 generates only a relatively low quantity of energy (for example between 250 microJoules and 400 microJoules) and that it must retain sufficient energy to switch on the electronic control circuit 18 again and send the control signal from the transmitter of the electronic control circuit 18.

It is therefore sought to adjust the product R.C (product of the resistance R by the capacitance C) to best observe these constraints, notably according to the characteristics of the components and notably characteristics of the processor.

Advantageously, a storage time is chosen which corresponds as closely as possible to the start-up time of the processor in the electronic control circuit 18, for example a time greater than or equal to the start-up time but at least than or equal to 110% of this time or to 105% of this time.

For example, the higher the resistance R value, the higher the capacitance C value, but with care taken to ensure that the value of the capacitance C is not too high, otherwise the capacitor will not have the time to charge sufficiently during the duration of the pulse (which, as was explained above, generally lasts at most around 10 microseconds).

Advantageously, the placement of the Zener diode Dz before the diode D makes it possible to limit the influence of the characteristics of the Zener diode on the storage of the signal by the capacitor C.

Preferably, a diode D is chosen which has the lowest possible leakage current, in order to avoid an immediate discharging of the capacitor C when the value of the voltage pulse decreases and goes back below the threshold voltage of the Zener diode Dz.

Preferentially, the electronic control circuit 18 can be configured to empty the capacitor C after having identified the sign of the pulse, in order to guarantee that the capacitor C will be in a neutral state upon reception of a future pulse.

As a variant, the pulse detection circuit 20 could be constructed differently. Notably, a detection circuit can be used which is capable of directly detecting the voltage whatever the sign, positive or negative.

The electronic control circuit 18 is configured to send the control signal once the sign of the voltage delivered by the energy harvesting device has been identified by the electronic control circuit (using the pulse detection circuit 20).

The control signal generated by the electronic control circuit 18 contains the information representative of the sign of the output electrical voltage.

For example, the generation of the control signal can consist in choosing from among prestored signals, or prestored messages, based on the result of the identification of the sign of the voltage, these signals being then sent by means of the transmitter.

For example, the messages can be radiofrequency messages comprising a frame containing a header and a body, in which is stored a numeric value, or a symbol or any other datum representative of the identified sign.

Generally, by virtue of the invention, it is possible notably by virtue of the assembly 10 to detect the position of the button 6 (or, in an equivalent manner, the direction of displacement of the button 6) upon each actuation of the button 6. The corresponding information can then be incorporated in the control signal which is sent to the remote device. The control device 2 despite everything remains energy-autonomous, the processing and the sending of the control signal being performed using the energy collected upon the actuation of the button 6.

This solution is particularly advantageous, because the pulse detection circuit 20 makes it possible to determine and store the sign of the voltage (which indicates the direction of the movement of the button 6) upon reception of the pulse generated by the energy harvesting device 12.

This information is stored for a certain time, the time for the transmitter and the processor of the electronic control circuit 18 to start and be fully operational, it being understood that the electronic control circuit 18 is stopped when the electronic control circuit 18 is not powered, and that the restarting is not instantaneous but can, on the contrary, take a time of a few milliseconds at least.

This solution is, moreover, relatively compact and therefore easy to incorporate in the housing 4.

Figure 4:
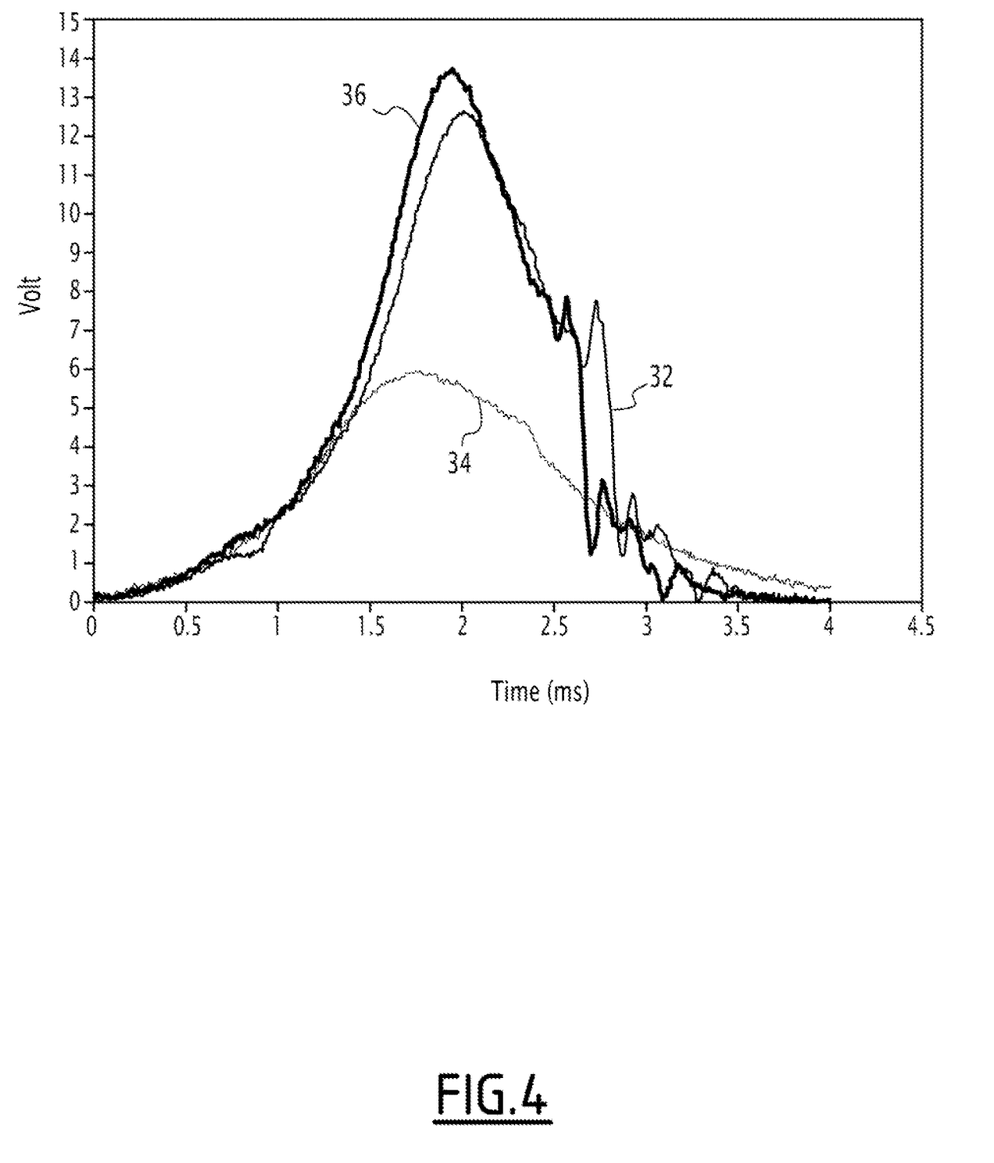
FIG. 4 schematically represents an example of a voltage pulse generated by an energy harvesting device of the wireless control device.

FIG. 4 represents an example of electrical voltage pulse generated by the energy harvesting device 12 when the button 6 is actuated. The voltage pulse is, here, of positive sign.

In this figure, the voltages are expressed in volts (Y axis, denoted "volt" in the figure) as a function of the elapsed time (X axis, denoted "time" in the figure and expressed in milliseconds (ms)).

The curve 32 represents the voltage at the terminals of the capacitor of the pulse detection circuit 20 of FIG. 3 when the energy harvesting device 12 generates a voltage pulse.

The curve 34 represents the voltage at the terminals of the resistor of the pulse detection circuit 20 of FIG. 3 when the energy harvesting device 12 generates a voltage pulse.

The curve 36 represents the voltage delivered between the output terminals of the pulse detection circuit 20 of FIG. 3 when the energy harvesting device 12 generates a voltage pulse and when no electrical load is connected between these terminals.

Figure 5:
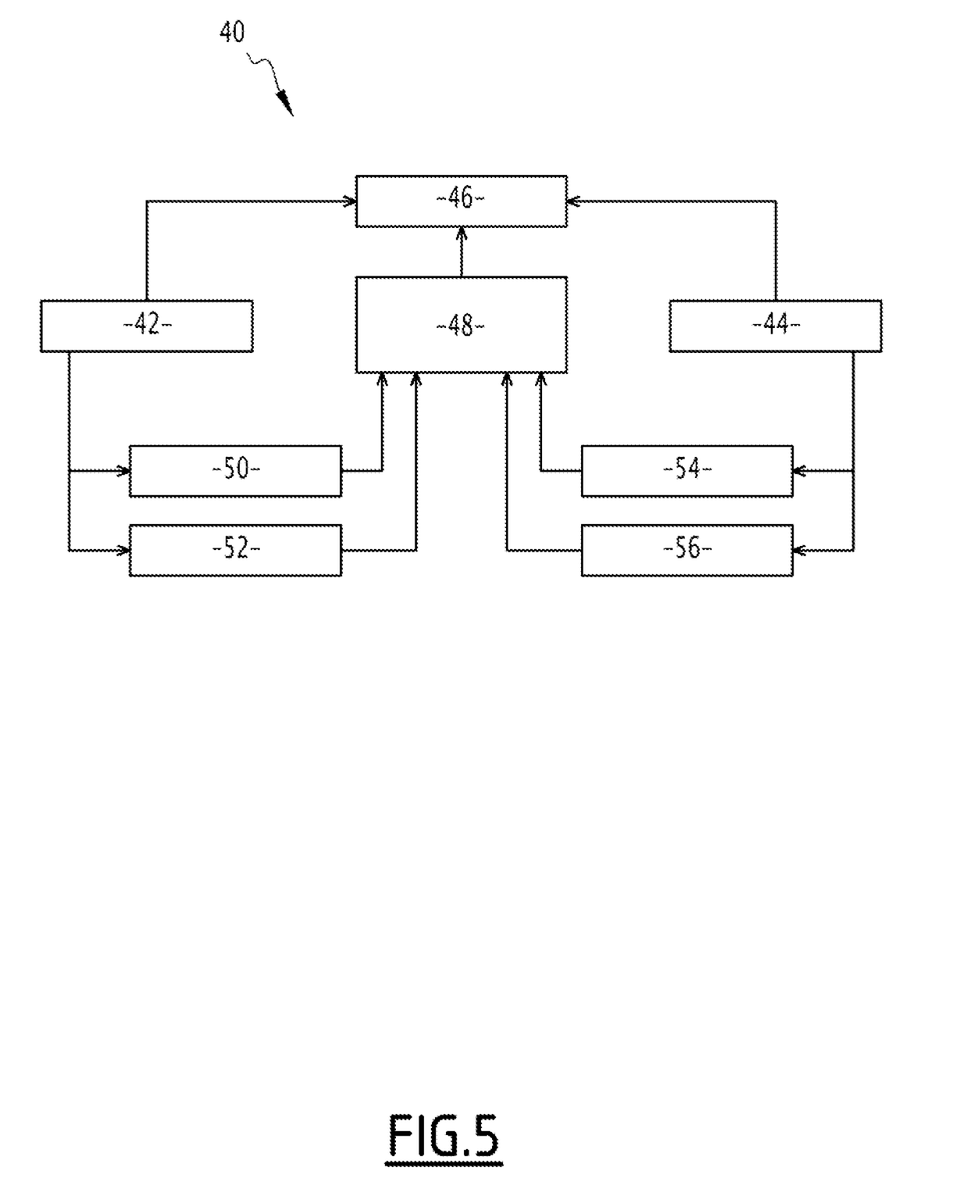
FIG. 5 schematically represents an embodiment of a wireless control device comprising two buttons associated with a same electronic control circuit.

FIG. 5 represents an embodiment of a wireless control device 40 comprising two buttons that can be actuated independently of one another which share a same electronic control circuit. The two buttons of the wireless control device 40, although not shown, are analogous to the button 6 described previously.

The constituent elements of this control device 40 are similar to those described with reference to the wireless control device 2, both in their structure and in the way they function. These elements are not therefore described in detail, in as much as the above description can be transposed to them.

The control device 40 comprises a first button coupled to a first energy harvesting device 42 and a second button coupled to a second energy harvesting device 44.

The first energy harvesting device 42 and the second energy harvesting device 44 are similar to the energy harvesting device 12.

Each button 6 is coupled to the corresponding energy harvesting device by a transmission mechanism, like that described previously for the energy harvesting device 12.

The control device 40 also comprises an electrical power supply device 46 and an electronic control circuit 48, respectively similar to the electrical power supply device 14, 16 and to the electronic control circuit 18.

The first energy harvesting device 42 and the second energy harvesting device 44 are configured to electrically power the electronic control circuit 48, via the electrical power supply device 46.

To this end, the energy harvesting devices 42 and 44 are both connected to the electrical power supply device 46.

The control device 40 also comprises a pulse detection circuit associated with each energy harvesting devices 42 or 44.

In the example illustrated, pulse detection circuits are used that are similar to those of the embodiment of the detection circuit 20 illustrated in FIG. 3, the latter being able to detect only a pulse of a given sign (positive sign in this example). Two similar pulse detection circuits are then used: a first to detect a pulse of positive sign and a second to detect a pulse of negative sign, the latter being able to be similar to the first pulse detection circuit to which is added at the input an element which inverts the sign of the measured voltage.

Thus, the control device 40 comprises a first pulse detection circuit 50 and a second pulse detection circuit 52, both connected at the output of the first energy harvesting device 42 and their respective outputs are connected to inputs of the electronic control circuit 48.

The first pulse detection circuit 50 and the second pulse detection circuit 52 are, for example, similar to the pulse detection circuit 20 previously described, and have a role similar to the latter.

Notably, the first pulse detection circuit 50 is configured to detect an output electrical voltage of the first energy harvesting device 42 having a first sign (and corresponding to a first direction of actuation of the first button), whereas the second pulse detection circuit 52 is configured to detect an electrical voltage having a second sign (and corresponding to a second direction of actuation of the first button).

The control device 40 also comprises a third pulse detection circuit 54 and a fourth pulse detection circuit 56, respectively similar to the first pulse detection circuit 50 and to the second pulse detection circuit 52.

The third pulse detection circuit 54 and a fourth pulse detection circuit 56 are both connected at the output of the second energy harvesting device 44 and their respective outputs are connected to other inputs of the electronic control circuit 48.

The third pulse detection circuit 54 is configured to detect an output electrical voltage of the second energy harvesting device 44 having a first sign (and corresponding to a first direction of actuation of the second button 6), whereas the fourth pulse detection circuit 56 is configured to detect an electrical voltage having a second sign (and corresponding to a second direction of actuation of the second button).

Thus, the electronic control circuit 48 is configured to determine which of the two buttons has been actuated and also to determine the direction in which this button has been actuated.

This embodiment makes it possible to optimize the design of the control device 40 and reduce the manufacturing cost of a two-button wireless control device, in as much as only a single electronic control circuit is used, instead of using two independent electronic control circuits in a same housing.

Many other embodiments are possible.

The embodiments and the variants considered above can be combined with one another to create new embodiments.

The invention claimed is:

1. A wireless control device, comprising:
a housing,
a movable actuation element that can be operated from outside of the housing,
an electronic control circuit comprising a wireless transmitter capable of transmitting a control signal to an electrical device,
an energy harvesting device configured to electrically power the electronic control circuit, the energy harvesting device being mechanically coupled to the movable actuation element by means of a transmission mechanism and configured to convert mechanical energy into electrical energy when the movable actuation element is actuated, by delivering an output electrical voltage between the output terminals,
wherein the direction of movement of the transmission mechanism determines the sign of the output electrical voltage delivered by the energy harvesting device,
wherein the control circuit further comprises an electrical power supply device and a pulse detection circuit, the electrical power supply device and the pulse detection circuit being connected in parallel between the output terminals of the energy harvesting device and an input of the transmitter,
wherein the electrical power supply device is configured to accumulate the electrical energy supplied by the energy harvesting device and, with the accumulated electrical energy, electrically power the transmitter temporarily for the transmitter to be able to send the control signal,
and wherein the pulse detection circuit is configured to identify the sign of the output electrical voltage and to store information representative of the sign of the output electrical voltage, the transmitter being further configured to include, in the control signal sent, the information representative of the sign of the output electrical voltage.

2. The wireless control device according to claim 1, wherein the sign of the electrical voltage delivered by the energy harvesting device is positive when the transmission mechanism is displaced in a first direction and negative when the transmission mechanism is displaced in a second direction, the second direction being opposite to the first direction.

3. The wireless control device according to claim 1, wherein the pulse detection circuit comprises a memory, such as a capacitor, configured to store a signal representative of the sign of the voltage delivered by the energy harvesting device.

4. The wireless control device according to claim 3, wherein the electronic control circuit is configured to automatically empty the memory of the pulse detection circuit once the sign of the voltage delivered by the energy harvesting device has been identified by the electronic control circuit.

5. The wireless control device according to claim 1, wherein the pulse detection circuit comprises a capacitor and a resistor.

6. The wireless control device according to claim 1, wherein the control device comprises:
   an additional movable actuation element,
   an additional energy harvesting device mechanically coupled to the additional movable actuation element and configured to electrically power the electronic control circuit,
   at least one additional pulse detection circuit connected at the output of the additional energy harvesting device, the additional pulse detection circuit being connected to the electronic control circuit and being configured to identify the sign of the output electrical voltage of the additional pulse detection circuit and to store information representative of the sign of said output electrical voltage.

7. The wireless control device according to claim 1, wherein the transmitter is a radio transmitter.

8. The wireless control device according to claim 1, wherein the wireless control device is a switch of pushbutton type.

9. The wireless control device according to claim 1, wherein the wireless control device is a toggle switch.

10. The wireless control device according to claim 1, wherein the control device is energy-autonomous.

* * * * *